United States Patent [19]

Sheldon

[11] Patent Number: 6,059,409
[45] Date of Patent: May 9, 2000

[54] SUNGLASSES WITH INTERCHANGEABLE LENSES AND KIT THEREFOR

[75] Inventor: Brent Sheldon, St-Lambert, Canada

[73] Assignee: Nevshell Marketing Inc., St-Lambert, Canada

[21] Appl. No.: 09/243,463

[22] Filed: Feb. 3, 1999

Related U.S. Application Data

[60] Provisional application No. 60/073,713, Feb. 4, 1998, and provisional application No. 60/080,576, Apr. 3, 1998.

[51] Int. Cl.$^7$ ..................................................... G02B 1/04
[52] U.S. Cl. ........................................... 351/106; 351/103
[58] Field of Search ............................... 351/86, 83, 103, 351/105, 106, 92, 91, 90, 41, 63

[56] References Cited

U.S. PATENT DOCUMENTS 5,640,215  6/1997  Kanda ........................................ 351/63
5,903,331  5/1999  Lin ........................................... 351/105

*Primary Examiner*—Hung Xuan Dang
*Attorney, Agent, or Firm*—Swabey Ogilvy Renault

[57] ABSTRACT

The invention relates to interchangeable lens sunglasses and a kit comprising interchangeable lens sunglasses, extra lens and a case for storing the extra lens and the sunglasses. The sunglasses of the present invention comprises a sunglasses frame and two detachable lenses. The frame comprises a horizontal bar having two opposite ends, depending temples at each of the opposite ends, a bridge portion mounted centrally to the bar, a tongue provided near each of the opposite ends and projecting downwardly and toward the other end of the two opposite ends. The bridge portion comprises a nose pad. The two detachable lenses are made of a light-transmitting material and are mounted to the frame above the bar in a plane generally parallel to the bar. Each of the lenses comprises a recess for receiving the tongue in a tight-fit manner and for mounting and securing each of the lenses on said frame between the nose pad and the tongue.

8 Claims, 2 Drawing Sheets

SUNGLASSES WITH INTERCHANGEABLE LENSES AND KIT THEREFOR

This application claims benefit of provisional application Ser. No. 60/073,713, Feb. 04, 1998.

This application claims benefit of provisional application Ser. No. 60/050,576 Apr. 03, 1998.

BACKGROUND OF THE INVENTION (a) Field of the Invention

The invention relates to sunglasses with interchangeable sunglass lenses and a kit comprising a sunglass frame with interchangeable sunglass lenses, extra lenses and a case for storing the extra lenses and the sunglasses.

(b) Description of Prior Art

Eyeglasses are worn during a wide variety of activities and must be capable of meeting a wide variety lighting conditions. In some cases, people having contact lenses still need a pair of glasses with prescription lenses. If these persons want sunglasses, they require two pair of sunglasses, one with and one without prescription strength. Each pair of sunglasses is stored in different sunglass cases.

It would be highly desirable to provide sunglasses or eyeglasses having interchangeable lenses.

It would also be highly desirable to provide a sunglass case for storing and/or protecting other sets of lenses to be used with the sunglasses. Such sunglass case could be sold in a kit with interchangeable lenses and the interchangeable sunglasses.

SUMMARY OF THE INVENTION

One aim of the present invention is to provide interchangeable sunglasses with interchangeable lenses.

Another aim of the present invention is to provide a kit comprising interchangeable sunglasses, interchangeable lenses adapted to be releasably mounted onto the interchangeable lens sunglass frame and a case for storing and for protecting the interchangeable lenses when not mounted on the frame.

In accordance with the present invention there is provided a sunglass kit comprising a sunglass case, a sunglasses frame and interchangeable lenses.

The sunglass case comprises a sunglass compartment and at least one pocket for storing and protecting interchangeable lenses.

The sunglasses frame comprises a horizontal bar having two opposite ends, depending temples at each opposite ends, a bridge portion, and a tongue. The bridge portion comprises a nose pad and is mounted centrally to the bar. The tongue is provided near each opposite ends and projects downwardly and toward the other end of the two opposite ends.

The interchangeable lenses are made of a light-transmitting material. Each of the lenses comprises a recess for receiving the tongue in a tight-fit manner and for securing each of the lenses on the frame, such that when the tongue is inserted in the recess, the lenses are secured between the nose pad and the tongue, defining a plane generally parallel to the bar.

Preferably, the lenses comprises at least two recess, one of which for receiving the tongue and the other one of which engaging and cooperating with the nose pad.

Preferably, the nose pad comprises another tongue mounted thereon for cooperating and engaging with the other one of the two recess.

Optionally, the pocket comprises a plurality of compartments for individually storing and protecting the interchangeable lenses.

The lenses made of light-transmitting material are preferably made of a sun-protective material.

The lenses define pairs of lenses. Preferably, each of these pairs of lenses has a different shade or tint.

Also in accordance with the present invention there is provided sunglasses comprising a sunglasses frame and two detachable lenses.

The sunglasses frame comprises a horizontal bar having two opposite ends, depending temples at each of these opposite ends, a bridge portion and a tongue. The bridge portion comprises a nose pad and is mounted centrally to the bar. The tongue is provided near each of these opposite ends and projects downwardly and toward the other end of these two opposite ends.

The detachable lenses are made of a light-transmitting material. The lenses are mounted to the frame above the bar in a plane generally parallel to the bar. Each of the lenses comprises a recess or receiving the tongue in a tight-fit manner and for mounting and securing each of the lenses on the frame, such that when the tongue is inserted in the recess, the lenses is secured between the nose pad and the tongue.

BRIEF DESCRIPTION OF THE DRAWINGS

Having thus generally described the nature of the invention, reference will now be made to the accompanying drawings, showing by way of illustration a preferred embodiment thereof, and wherein.

DETAILED DESCRIPTION OF THE INVENTION

In accordance with the present invention, there is provided a sunglasses kit comprising a sunglasses case, a sunglasses frame and interchangeable lenses adapted to be mounted to the sunglasses.

Figure 1:
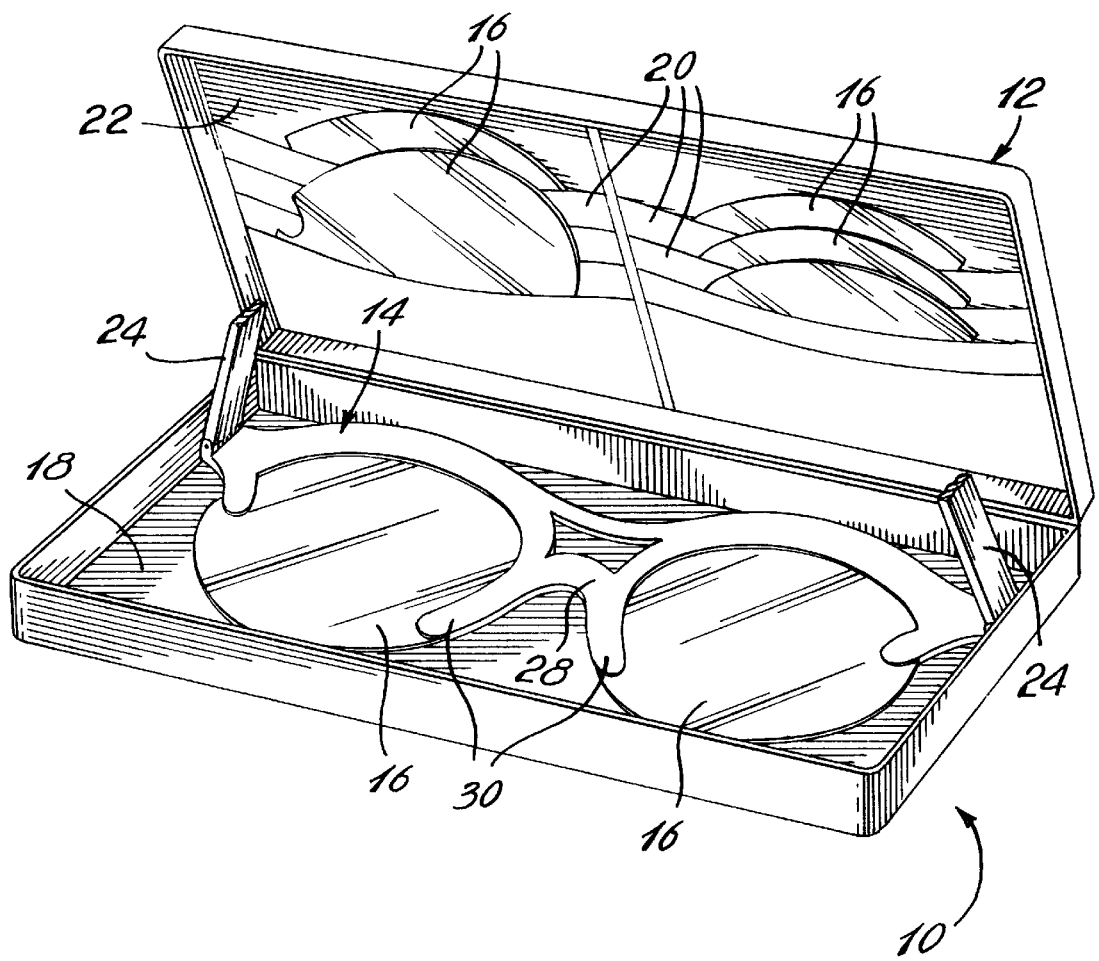
FIG. 1 is a schematic view illustrating a preferred embodiment of kit comprising a sunglasses case, sunglasses and interchangeable lenses.

As seen in FIG. 1, the kit 10 in accordance with a preferred embodiment of the invention comprises a sunglasses case 12, sunglasses frame 14, and interchangeable lenses 16.

The sunglasses case 12 comprises a sunglasses is compartment 18 and lenses pockets 20 provided in the cover portion 22 of the case 12. FIG. 1 illustrates two interchangeable lenses 16, one of which is partially inserted in the pocket 20, the other lens 16 being fully inserted in the pocket 20. The cover portion 22 is illustrated as comprising ten (10) pockets for securing or protecting five (5) pairs of interchangeable lenses. The kit of the present invention would allow somebody who wear sunglasses to store and protect not only the sunglasses but also the interchangeable lenses.

Of course, the case 12 could be provided with more or less pockets for receiving interchangeable lenses. Furthermore, the case 12 could also be a pouch for with pockets for storing the sunglasses and the interchangeable lenses.

Figure 2:
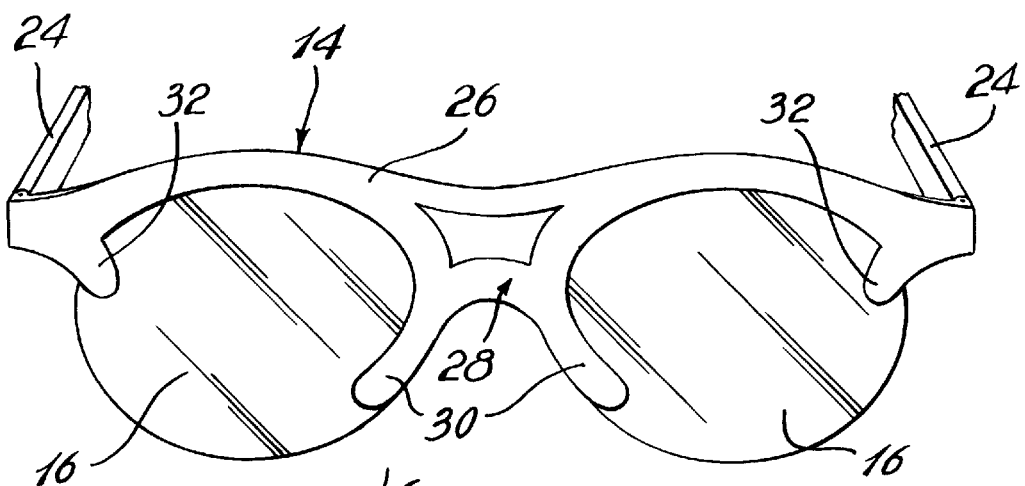
FIG. 2 is a schematic view of the sunglasses according to the preferred embodiment of FIG. 1.
Figure 3:
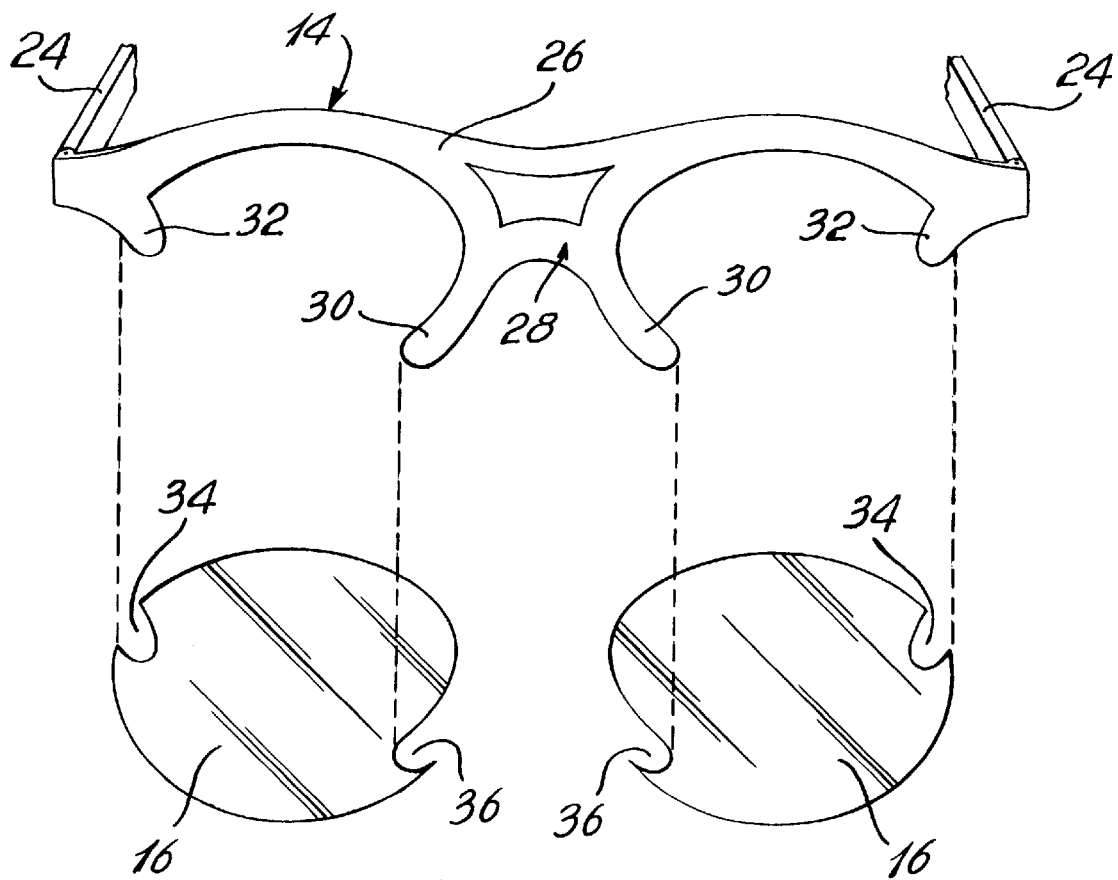
FIG. 3 is an exploded view illustrating a sunglasses frame and lenses according to the preferred embodiment of FIG. 1.

As illustrated in FIGS. 2 and 3, the sunglasses frame 14, partially illustrated with truncated temples 24, comprises an upper bar 26, a nose bridge 28 mounted at a central lower portion of the upper bar. The nose bridge 28 comprises two (2) nose pads 30 for supporting the frame 14 or the sunglasses on somebody's nose.

The frame further comprises at a lateral and distal portion of the frame, on each side thereof, a tongue 32 for clipping the interchangeable lens 16.

The interchangeable lens 16 is provided with two opposite grooves 34 and 36. The groove 34 is distal from a central vertical axis of symmetry of the frame. The distal groove 34 is adapted to receive in a tight fit fashion the tongue 32. The groove 36 is proximal relative to the central vertical axis of symmetry. The proximal groove 36 is adapted to engage with the nose pad 30. For mounting a lens on the frame, the proximal groove is first engaged with the nose pad. The lens is then pivoted about the nose pad for inserting the tongue 32 in the distal groove 34, in a tight fit fashion for securing the lens to the frame.

The frame and the lenses could also comprise other tongues and grooves for securing the lenses thereto. In fact, one could imagine that the proximal groove engage another tongue provided on a proximal portion of the frame, instead on engaging with the nose pad.

The preferred embodiment of the present invention being sunglasses, the term sunglasses is used generally throughout the specification of the present application. However, the term sunglasses in the present application is intended to designate any eyeglasses.

While the invention has been described in connection with a specific embodiment thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A sunglass kit comprising:
    a sunglass case comprising a sunglass compartment and at least one pocket for storing and protecting interchangeable lenses;
    a sunglass frame comprising a bar having two opposite ends, depending temples at each of said opposite ends, a bridge portion mounted centrally to said bar, a tongue provided near each of said opposite ends and projecting downwardly and toward the other end of said two opposite ends, said bridge portion comprising a nose pad; and
    interchangeable lenses made of a light-transmitting material, each of said lenses defining at least two recesses, one of said at least two recesses for receiving the tongue and the other of said at least two recesses for engaging and cooperating with the nose pad,
    whereby when said tongue is inserted in said one of said at least two recesses, said lenses are secured between said nose pad and said tongue, defining a plane generally parallel to said bar.

2. The kit of claim 1, wherein said nose pad comprises another tongue mounted thereon for cooperating and engaging with said other one of said two recesses.

3. The kit of claim 1, wherein said pocket comprises a plurality of compartments for individually storing and protecting said interchangeable lenses.

4. The kit of claim 1, wherein said light-transmitting material is a sun-protective material.

5. The sunglasses kit of claim 4, wherein said lenses define pairs of lenses, each of said pairs of lenses has a different shade or tint.

6. Sunglasses comprising:
    a sunglass frame comprising a bar having two opposite ends, depending temples at each of said opposite ends, a bridge portion mounted centrally to said bar, a tongue provided near each of said opposite ends and projecting downwardly and toward the other end of said two opposite ends, said bridge portion comprising a rose pad; and
    two detachable lenses made of a light-transmitting material, said lenses being mounted to said frame above said bar in a plane generally parallel to said bar, each of said lenses defining at least two recesses, one of said at least two recesses for receiving tie tongue and the other of said at least two recesses for engaging and cooperating with the nose pad,
    whereby when said tongue is inserted in said one of said at least two recesses, said lenses are secured between said nose pad and said tongue.

7. The sunglasses of claim 6, wherein said nose pad comprises another tongue mounted thereon for cooperating and engaging with said other one of said two recesses.

8. The sunglasses of claim 6, wherein said light-transmitting material is a sun-protective material.

* * * * *